US005361495A

United States Patent [19]

Pyle et al.

[11] Patent Number: 5,361,495

[45] Date of Patent: Nov. 8, 1994

[54] ROOF TRUSS FABRICATION METHOD

[76] Inventors: Stoddard H. Pyle, 3955 SW. Brooklane Dr., Corvallis, Oreg. 97333; Frank P. Morris, 13828 209th NE., Woodinville, Wash. 98072

[21] Appl. No.: 972,123

[22] Filed: Nov. 5, 1992

[51] Int. Cl.[5] .......................... B23P 19/04; B30B 13/00

[52] U.S. Cl. .................................. 29/897.31; 269/910

[58] Field of Search ...................... 29/432, 432.1, 432.2, 29/897.3, 897.31, 897.312; 52/741.1; 269/37, 910

[56] References Cited

U.S. PATENT DOCUMENTS

| | | | |
|---|---|---|---|
| 2,996,721 | 8/1961 | Black | 29/897.31 X |
| 3,068,483 | 12/1962 | Moehlenpah et al. | 29/897.31 X |
| 3,100,301 | 8/1963 | Black | 29/897.31 X |
| 3,358,348 | 12/1967 | McGlinchey | 29/897.31 |
| 3,413,703 | 12/1968 | Sanford | 29/897.31 |

*Primary Examiner*—Peter Dungba Vo
*Attorney, Agent, or Firm*—Klarquist, Sparkman, Campbell, Leigh & Whinston

[57] ABSTRACT

A roof truss fabrication method and apparatus are disclosed in which multiple parallel guideways, or tracks, are laid out along the X axis in an X-Y coordinate system. Multiple pressing stands are mounted for movement on the tracks. A head portion of each stand is movable on its stand along the Y axis and may also be pivoted about a vertical reference axis. Each stand is driven along its track, and the drive means is coupled to a position indicator which gives a digital readout of the X coordinate position of the stand on its truck. Similarly, a drive means for each head is coupled to a position indicator which gives a digital readout of the Y coordinate position of the head. The stands and heads may be manually driven or driven through stepper or servo motors controlled remotely by computer to position each stand and head at predetermined X and Y coordinates of the system. The predetermined coordinates for each stand and head can be determined during the truss design, which is usually performed using computer software that can be readily modified to provide such coordinates.

9 Claims, 4 Drawing Sheets

ROOF TRUSS FABRICATION METHOD

FIELD OF THE INVENTION

This invention relates to the fabrication of wooden roof trusses utilizing movable pressing stands or other work supports positioned at the locations of the joints between the wood members of the truss for use in pressing metal connector plates into the members at such joints to form the truss.

BACKGROUND OF THE INVENTION

Wooden roof trusses comprise various pieces of dimensional lumber members typically held together at the intersections of the members by metal nail or connector plates to form a rigid structure. The metal nail plates are formed with a multiple number of teeth. The wooden members are held in the truss configuration by a jig that allows nail plates to be placed at the intersections of the wooden members. Nail plates are placed on both sides of the truss members at the intersection so as to form a rigid adjoinment when the nail plates are pressed into the wooden members.

Most trusses are fabricated either in a retaining jig laid out on a table serving as a work surface or on stands that are positionable over the work surface area. The table method utilizes a jig laid out on a table two to three feet above the floor. When the stand method is used, the stands are positioned at the intersections of the truss members to support the truss members and form the jig. The stands are at a similar height to the table.

When pressing stands are used, two general methods are used for positioning the stands. One method uses a smooth floor as a work surface so that the pressing stands can be easily moved around to desired positions. The floor may be covered with a steel sheet to allow securing of the pressing stands at desired locations with magnetic clamps. The other stand method uses a set (two) of base rails on a work surface with a number of sets of paired rails (branch rails) placed at ninety degrees to and extending from the base rails. Pressing stands are slidably mounted on the base rails. Pressing stands are also slidably mounted on the branch rails. The branch rails are slidably attached to the base rail. By positioning both the branch rails relative to the base rails and the stands on the base and branch rails, the stands can be located at the joints of a truss to be formed. Neither method of construction lends itself to precision placement of the pressing stands.

Where pressing stands are used, an hydraulic press formed in the shape of the letter "C" is used to press the connector plates into the wooden members. It is generally known as a C-clamp press. For trusses laid out on a table a roller press or gantry press is typically used.

In both the table and stand methods, the initial truss members must be used to finally position the jigs or stands holding the truss components before applying the connector plates. This is done after the jigs or stands are roughly positioned at the joints of the truss to be formed, typically using a tape measure. After the initial truss components are placed in the jig or on the stands, critical dimensions must be checked, such as height and span of the truss. Final adjustments of the positions of the jigs or stands are then made so that they coincide as precisely as possible with the intersections of the wooden members and the locations where the connector plates will be applied. When the initial truss components are used to set up the jig or stands, the jig or stands cannot be set up in their final locations until the truss components have been cut and brought to the press location.

The setup processes described are time consuming, labor intensive, and imprecise. Additionally, the table method of building trusses has the disadvantage of requiring that the workmen get up on the table and work in a crouched or bent over position. A higher incidence of back trouble results from the use of the table method of truss construction as compared to the stand method.

U.S. Pat. No. 4,943,038 to Harnden teaches the use of lead screws to position jig stops on a plurality of table sections in a table method of assembly. However, the method of this patent still requires that the initial truss be used to set up the jig stops and also requires that a worker place the truss components in place on the table prior to the press setup.

U.S. Pat. No. 4,754,910 to Rehn discloses a modified pressing stand method and apparatus for fabricating a roof truss. However, such method would appear still to require final positioning of the pressing stands along their guideways after the initial truss members are supported on the stands. Such method also provides no apparent method of accurately and quickly positioning the stands during the initial setup without the aid of manual measuring means.

SUMMARY OF THE INVENTION

Primary objectives of the present invention are to overcome the deficiencies of prior art table and pressing stand methods and apparatuses for fabricating wooden roof trusses by providing a method and apparatus providing quick, easy, and precise setup for any given roof truss design and size, without requiring an initial rough setup and without requiring the use of initial truss components.

Other important objectives of the invention are to provide:

1. A means and method of setting up a truss jig or stand apparatus by use of an X and Y coordinate system which enables the coordinates of each truss joint, and each jig or stand, to be determined from a computer-aided truss design system, thereby enabling the location of each movable component of the jig or stand for positioning truss members at the truss joints to be determined by its X and Y coordinates;
2. A truss fabrication method and system as aforesaid which utilize one or more parallel sets of guideways or tracks extending parallel to one of the coordinates and providing improved rigidity for mounting and moving the movable jig components, such as pressing stands;
3. An improved movable jig component, such as a pressing stand, for a truss fabrication system as aforesaid, the component having an upper pressing head portion that can be moved linearly at right angles to the direction of movement of the jig component on a parallel guideway so that the jig component can be positioned precisely with respect to predetermined X and Y coordinates for the desired position of the component.
4. A movable jig component, such as a pressing stand, as aforesaid wherein the pressing head can be angulated, or pivoted, to match the slope of a top chord of the truss to be fabricated;

5. A method and system of fabricating a truss that allows the press operator to stand erect while positioning the truss components with respect to prepositioned jig components;
6. A pressing stand or other movable jig component for an X-Y coordinate system and method of truss fabrication as aforesaid, in which the stand or jig component is adapted for precise positioning, either manually or automatically, through a drive coupled to a digital signal generating means for determining the exact position of a reference point on the pressing stand or other jig component with reference to the X-Y coordinate system, thereby enabling precise positioning of the jig component with respect to the joints of a truss to be fabricated without placing the initial truss members in the jig and without an initial rough positioning step.

In accordance with the foregoing objectives, roof trusses are designed and laid out, and pressing stands or other movable jig components for assembling the roof trusses are set up and positioned, using an X and Y coordinate system, whereby the joint or intersection of each truss member to be joined to another member by connector plates has a predetermined position relative to a point of origin and determined by X and Y coordinates. The pressing stands or other jig components are correspondingly assigned X and Y coordinates to position them properly for supporting the truss members at their joints.

In a presently preferred embodiment of the invention, multiple pressing stands are mounted for movement along spaced apart parallel tracks all extending parallel to the X axis of the coordinate system. During setup, each pressing stand is moved along its track to a preassigned X coordinate position along the X axis for supporting truss members to be joined at their joint, which also has a predetermined X coordinate. An upper head portion of the same stand is movable linearly relative to its base along the Y axis to a predetermined Y coordinate for supporting the same joint to precisely position the upper truss-engaging portion of the stand at the X and Y coordinates necessary to support the truss members at their joint and referenced to the coordinates of the joint.

When all stands are thus positioned, each precut wood truss member is laid out and positioned on the supporting portions of its supporting stands using conventional holding devices. Connector plates are then applied via a connector plate press, well known in the art, to interconnect the truss members at their joints.

The heads of the stands whose supporting portions are intended to receive the joint portions of web or diagonal truss members may be mounted for pivotal movement about a vertical axis to facilitate accurate positioning of such heads with respect to chord members of the truss.

A separate rack-and-pinion drive, coupled to a digital position indicator such as a digital readout device, moves each pressing stand along its guideway so that the position of each stand in terms of its X or Y coordinate can be determined during such movement. A similar drive system, with coupled position indicator, moves the movable head position to its other coordinate position. Alternatively, positioning of the stands can be accomplished through use of a computerized stepper or servo motor drive system.

The foregoing and other objects, features and advantages of the present invention will become more apparent from the following detailed description which proceeds with reference to the accompanying drawings.

DETAILED DESCRIPTION OF A PREFERRED EMBODIMENT

INTRODUCTION

Figure 1:
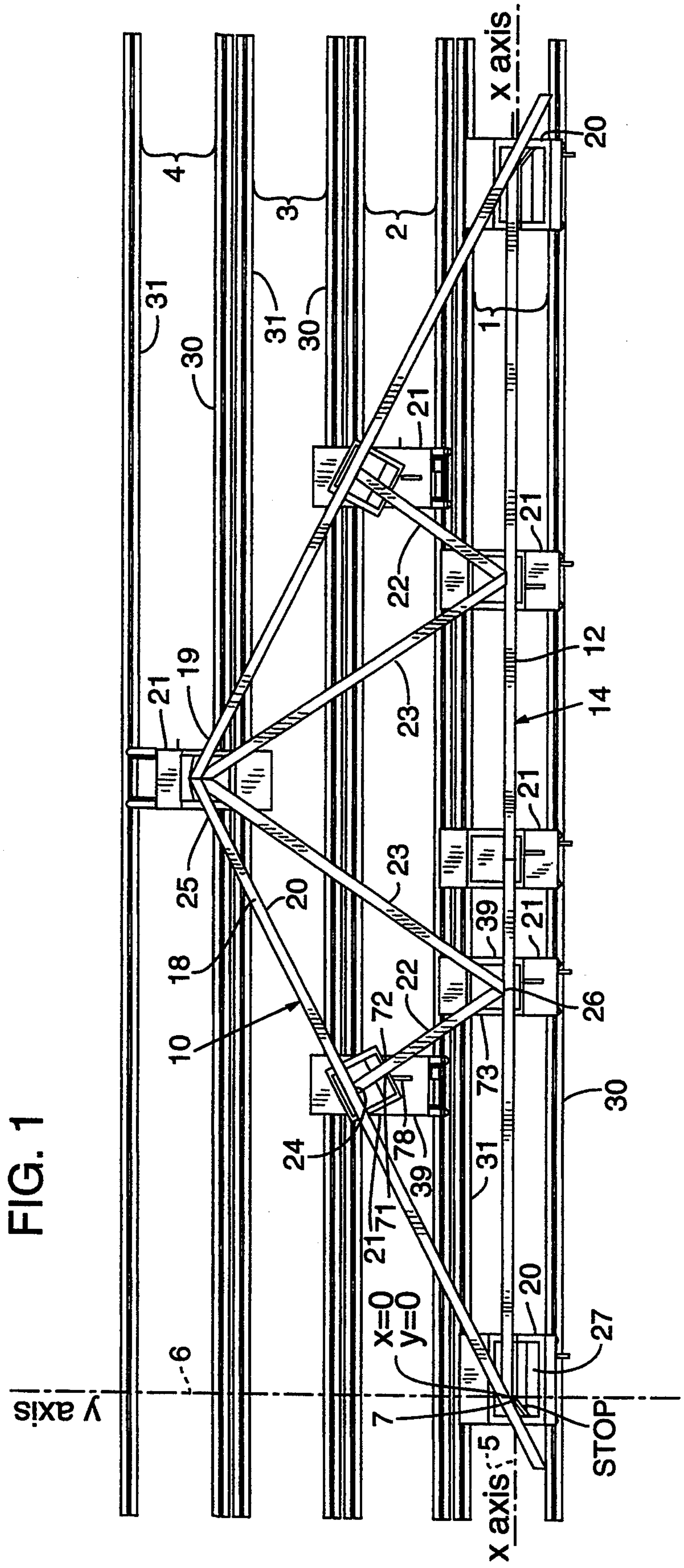
FIG. 1 is a top plan view of the apparatus of the invention including pressing stands mounted on parallel tracks.

Trusses, including the typical fink style truss 10 shown in FIG. 1, are designed around a theoretical envelope typically defined by the bottom 12 of the bottom chord 14 and the bottom 16 of the top chords 18, 19. Web members 22, 23 are attached to the top and bottom chords at predetermined positions (intersections or joints) 24, 25, 26 by metal connector plates 27 (FIG. 3), well known in the art, and the top and bottom chords are similarly interconnected at other joints as shown in FIG. 1. In the case of the fink style truss shown, a web member 22 is attached at the one-half panel point 24 on the top chord and attached at the one-third panel point 26 on the bottom chord. Another web member 23 is attached at the one-third panel point 26 on the bottom chord and attached to the intersection 25 of the two top chords. Two other web members 22, 23 are attached to a top chord and a bottom chord in a like manner to complete a symmetrical truss.

Most truss designs involve the use of specialized computer software to display a graphic image of the structure in total and the individual trusses making up the structure. The software assists the designer in selecting the lumber size and grade compatible with the span of the truss and the roof slope. The intersections of the wooden members are shown in the graphic display. The design software also specifies the minimum size plate connectors to be used. A design program such as described is also capable of specifying the location of the truss joints, and thus the pressing stands or other movable jig components as conceived in this invention, in terms of their X and Y coordinates.

APPARATUS-GENERAL ARRANGEMENT

Referring to FIG. 1, a truss pressing apparatus, or jig, in accordance with the invention includes a series of, in this case four, parallel sets of tracks or guideways 1, 2, 3, 4, all extending parallel to an X axis 5 and perpendicular to a Y axis 6 of an X-Y coordinate system having a zero point of origin 7 where the X and Y axes intersect to provide a zero reference point. Thus, all points or positions on the truss 10 can be described with reference to an X and Y coordinate as measured from the point of origin 7 of the coordinate system. For convenience, the intersection of the bottom of the bottom chord 14 and the bottom of the top chord 18 is positioned at the point of origin 7 of the coordinate system, and all other joints or intersections and pressing stand positions are described by X and Y coordinates referenced from the point of origin.

Similarly, the center line of each track 1, 2, 3, 4 has a position in the coordinate system that can be described by a Y coordinate referenced to the point of origin 7. Each track comprises a set of two flanged rails 30, 31, the configuration of which is shown more clearly with reference to FIGS. 2 and 3.

Mounted for movement along at least some of the tracks are multiple pressing stands 20 or 21. In the illustrated system, two pressing stands 20 and three pressing stands 21 are mounted for movement along track 1. Two pressing stands 21 are mounted for movement along track 2, and a single pressing stand 21 is mounted for movement along track 4. No pressing stand is mounted on track 3 because no pressing stand is required on track 3 to fabricate the truss 10 of the design shown. However, four tracks are provided to accommodate the fabrication of trusses of different designs and sizes. At least three sets of tracks would normally be required to fabricate most trusses, but some truss designs of limited sizes may only require one or two tracks, and as many tracks as desired can be provided. In general, the more sets of tracks provided, the greater versatility of the system in its ability to handle trusses of widely varying designs and sizes. However, it is conceivable that a single track with widely separated rails, mounting either multiple pressing stands or a single large stand with multiple independently movable heads, could be employed instead of the multiple track-multiple pressing stand system illustrated.

In general, there are only two significant differences between the pressing stands 20 and the pressing stands 21. First, the pressing stands 21 have an upper stand portion, or head, 39 to be described in greater detail shortly, that is pivotable about a vertical axis, whereas the stands 20 have heads that do not pivot. Second, the stands 20 are somewhat larger in size than the stands 21 and thus have larger work support portions such that they are particularly adapted for use in supporting the critical intersections of the bottom chord and top chords. This will be apparent from a comparison of the work support portion 73 of the stands 20 with the work support portion 73 of the stands 21 in FIG. 1.

Because of the similarity in construction and operation of the stands 20 and 21, except for those differences noted above, only stand 21 will be described in detail, it being understood that stand 20 will be of similar construction except for the differences noted.

PRESSING STAND DETAILS

Referring now especially to FIGS. 2–5A, a typical pressing stand 21 will be described in detail. Each pressing stand 21 includes a lower base frame portion 28 having brackets 29 depending from its lower end and mounting flanged rollers or wheel-type bearings 32, 33 on each of the set of rails 30, 31. Because of the box-like construction of the base frame, each stand is mounted for movement along the two rails by four wheels, two wheels 32 riding on rail 30 and two wheels 33 riding on track 31, for a stable and firm mounting.

An upper frame portion, or head, 39 of the pressing stand is mounted for linear movement relative to the lower frame portion 28 in a direction perpendicular to the X axis and parallel to the Y axis of the coordinate system. As previously mentioned, head 39 is also mounted for pivotal movement relative to the lower frame portion about a vertical axis 53.

Head 39 includes an upper work support surface portion 73 defined by three upper cross frame members 74 supported on upright frame members 75 affixed to a turntable base 47. Longitudinal slots 80 in support surfaces 73 mount various jig components for adjustable positioning on the head. For example, in FIG. 6 upper cross frame members 74 of the head 39 mounts abutment members 70 in slots 80 to fix the location 39 of truss chord 18. At the same time, conventional roller-type stops 71, 72 are also mounted in slot 80 of a cross frame member 74 to abut and fix the position of truss web member 22. The lower portion of head 39 is defined by a sub base 45 movable linearly along the Y axis on and relative to base frame 28, a base carriage 46 mounted by keys 48, 49 (FIG. 2) in keyways for slidable movement on and relative to sub base 45, and the aforementioned turntable base 47, mounted on carriage base 46 and movable linearly therewith but rotatable relative thereto about the pivot axis 53. A pivot shaft 51 and nut 50 mount turntable base 47 for pivoting movement on carriage base 46. By tightening nut 50 using a nut handle 54 (FIG. 3) head 39 can be secured in an adjusted angular position relative to carriage base 46 and the remainder of the pressing stand. A flange on shaft 51 allows the turntable base to be locked in its adjusted angular position to carriage base 46 when nut 50 is tightened.

A stud 61 mounted within a circular opening (not shown) within sub base 45 and secured by a nut 52 rides within a slotted opening 78 (FIG. 6) of carriage base 46 to allow longitudinal travel of carriage base 46 relative to sub base 45, guided by keys 48, 49 to ensure such movement only along the Y axis.

Figure 3:
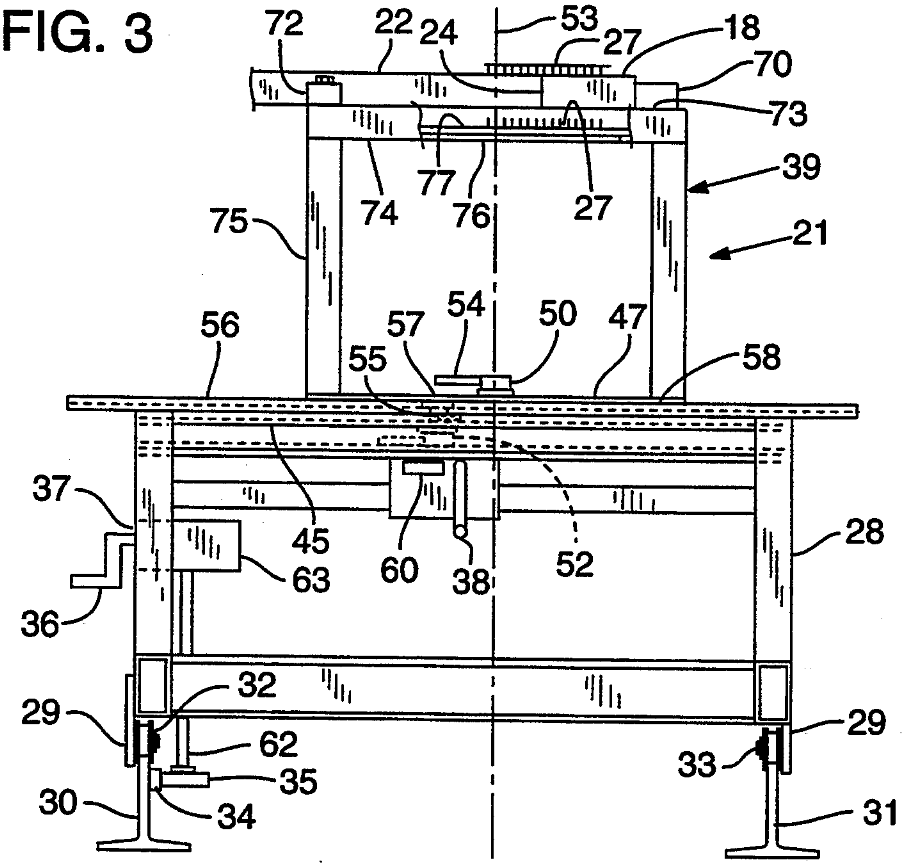
FIG. 3 is a side elevational view of the pressing stand of FIG. 2 with a portion broken away to show a pair of connector plates supported on an upper portion of the stand and on supported truss members, in position for being pressed into the truss members at their intersection.
Figure 5:
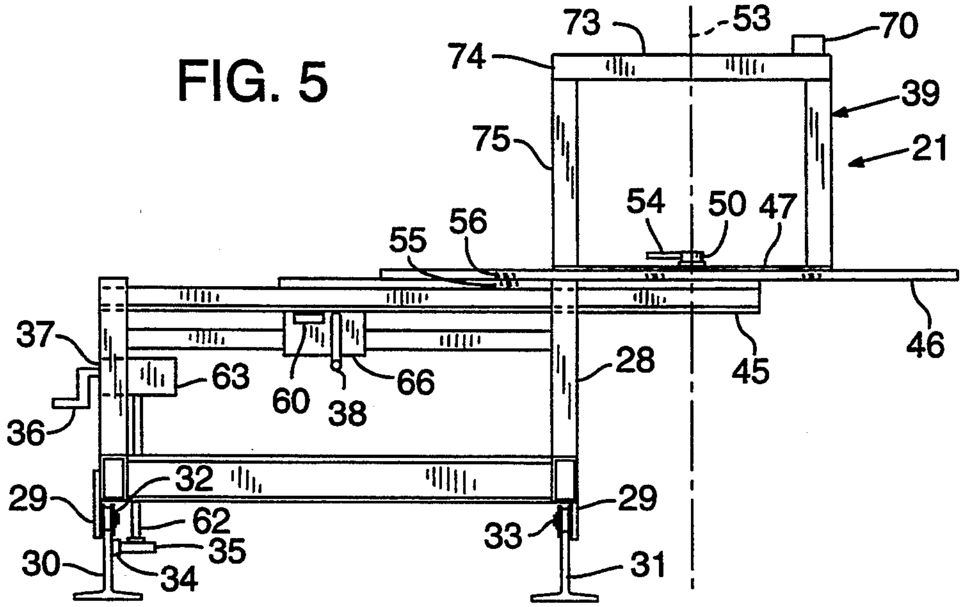
FIG. 5 is a side elevational view similar to FIGS. 3 and 4 but with the upper or head portion of the stand positioned on the far right.
Figure 5A:
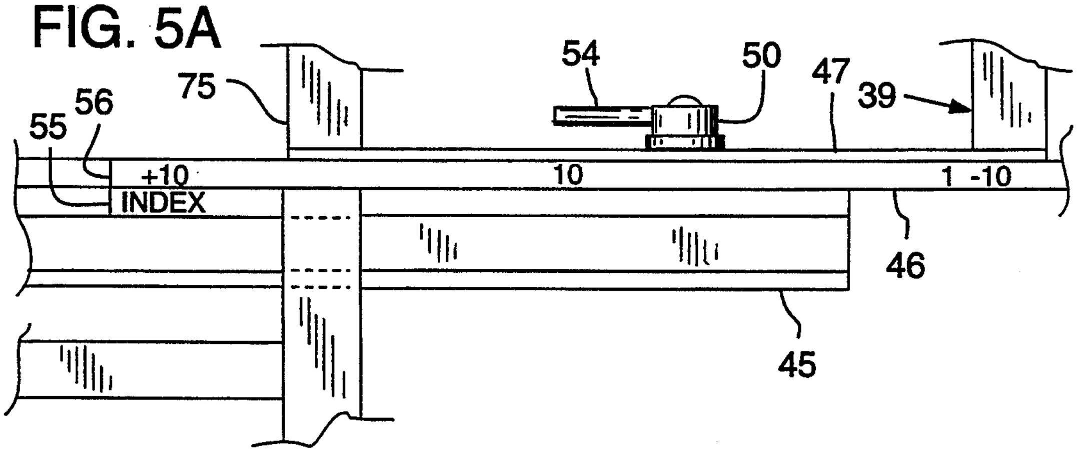
FIG. 5A is an enlargement of a portion of FIG. 5 showing more clearly the indexing portion of the pressing stand.

An index line 55 is scribed on the side of sub base 45, as shown in FIG. 3 and best in FIG. 5A. Position lines 56, 57, 58 are scribed on a corresponding side of carriage base 46. By loosening nut 52, carriage base 46 can be caused to slide longitudinally in relationship to sub base 45 to increase the Y axis range of pressing stand 21. Position lines 56, 57 and 58 on carriage base 46 provide known distances to be added to or subtracted from the Y coordinate position indicator to be described. The combination of sub base 45 movable along the Y axis relative to base frame 28 and carriage base 46 slidable on the sub base, gives head 39 of the pressing stand a range of movement in the Y direction sufficient to enable positioning of work support portion 73 of the head at any Y coordinate between the rails 30, 31 of its associated track and beyond, i.e. in a Y coordinate range that overlaps the Y coordinate ranges of the adjacent tracks.

This will be apparent from FIG. 1, which shows various pressing stands 21 in various positions of adjustment along the Y axis.

Figure 4:
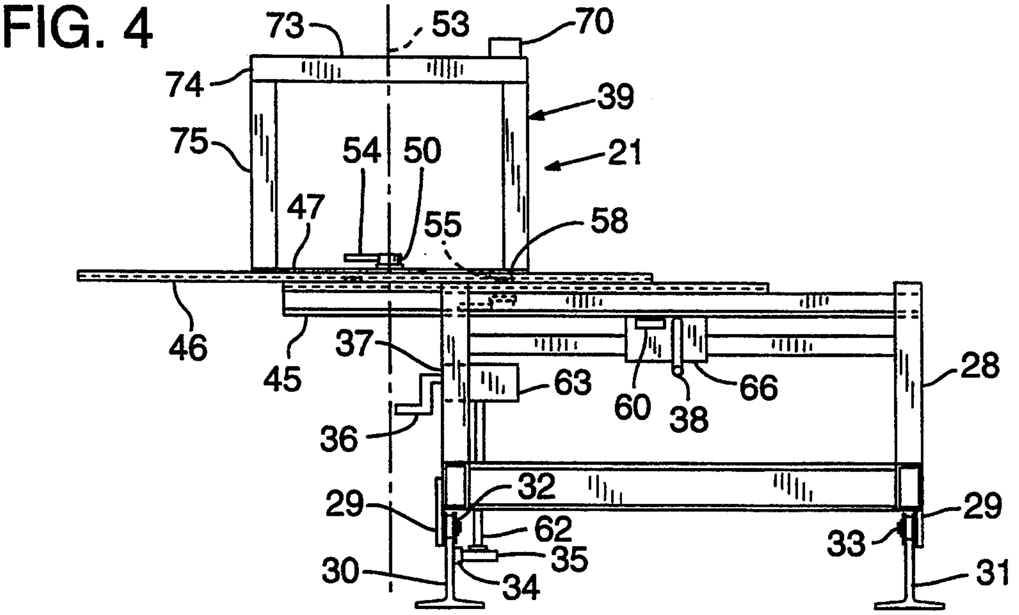
FIG. 4 is a side elevational view similar to FIG. 3 but with the upper or head portion of the stand positioned on the far left.

The extreme range of movement of head 39 along the Y axis is also illustrated in FIGS. 3, 4, 5 and 5A. In FIG. 3, head 39 is centered with respect to base frame 28 by aligning positioning line 57 of carriage base 46 with index line 55 of sub base 45. In FIG. 4, however, head 39 is positioned at its maximum negative Y coordinate from the Y coordinate of its associated track defined by rails 30, 31 by shifting sub base 45 to its extreme left-hand position shown relative to base frame 28 and by sliding carriage base 46 on sub base 45 so that position line 58 on the carriage base lines up with index line 55 on the sub base. In FIGS. 5 and 5A, head 39 is moved to its extreme positive Y coordinate as measured from the Y coordinate of the track defined by rails 30, 31 shown in FIG. 4 by shifting sub base 45 to its extreme right-hand position shown relative to base frame 28 and by aligning positioning line 56 of carriage base 46 with the index line 55 on the sub base 45.

Figure 2:
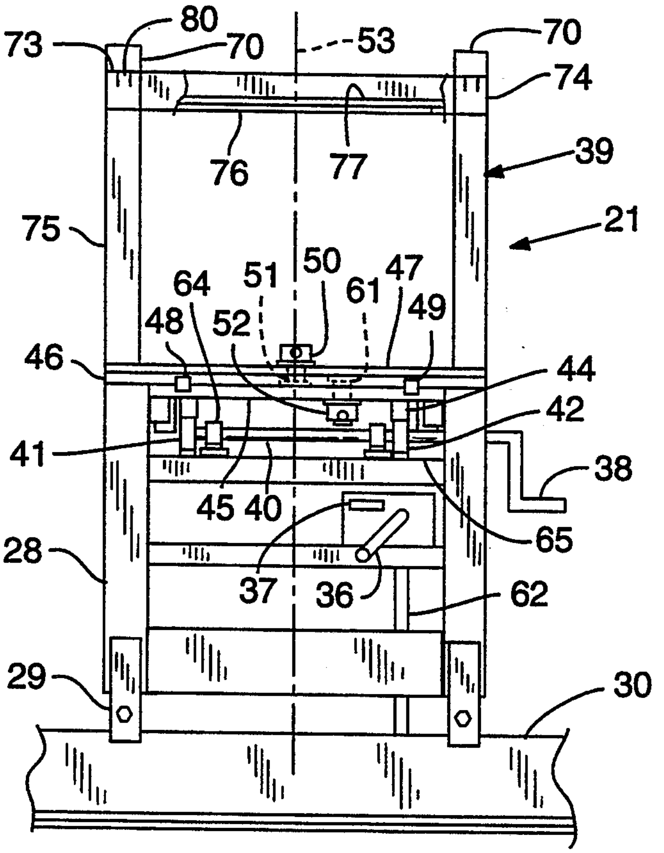
FIG. 2 is a front elevational view of one of the pressing stands of FIG. 1 on an enlarged scale.

Head 39, as viewed best in FIGS. 2 and 3, also includes a flange 76 extending inwardly from upper cross frame members 74. Flange 76 supports a platen 77 spanning the interior space defined by the cross frame members. As shown in FIG. 3, platen 77 supports the lower one of the pair of connector plates 27 below the level of two truss members, such as truss members 18 and 22, to be joined. The other plate 27 of the pair is supported on the truss members at their joint, with the truss members held in position on support surface 73 by rollers 71, 72 and abutment members 70. With the connector plates and truss members thus positioned, a conventional C-shaped hydraulic press (not shown) having an upper arm engaging upper plate 27 and a lower arm engaging platen 77, moves the platen upwardly to press both connector plates 27 into the truss members.

In the preferred embodiment, a manually operated drive means is provided for moving each pressing stand, 20, 21 along its associated set of guide rails 30, 31. This drive means is coupled to a position indicator referenced to the zero origin of the X-Y coordinate system so that at any given time during movement of the pressing stand along the X axis, the X coordinate of the stand can be determined. A similar manually operated drive system and coupled position indicator are used to determine the Y coordinate of the head 39 during movement of the sub base 45 relative to base frame 28.

Referring to FIGS. 2 and 3, the drive means for driving the press stand along rails 30, 31 includes a rack 34 fixed to an inside surface of rail 30 and extending along such rail parallel to the X axis. A pinion gear 35 mates with rack 34 and is driven through a drive shaft 62, gearbox 63 and crank handle 36 on base frame 28. Thus, by turning crank handle 36, drive shaft 62 is rotated to drive pinion 35 along rack 34 to move the press stand along its guide rails. Gearbox 63 incorporates a position indicator in the form of a digital readout device 37 referenced to the origin or zero point of the X-Y coordinate system in which the pressing stands move. Thus, at any given position of pressing stand 21 along its track, its X coordinate can be determined simply by a direct reading of the digital readout 37.

The drive means for the head 39 includes a pair of gear racks 43, 44 affixed to the underside of sub base 45 as shown best in FIG. 2. Pinion gears 41, 42 carried by a drive shaft 40 mate with racks 43, 44 respectively. A crank handle 38 is coupled to gear shaft 40. Gear shaft 40 is journaled in bearings 64 affixed to a cross frame member 65 of base frame 28. As shown in FIG. 3, crank handle 38 is coupled to pinion gear shaft 40 through a gear box 66 that includes a position indicator in the form of a digital readout device 60 of the same type as digital readout device 37 previously described. Thus by turning crank handle 38, sub base 45 is driven along the Y axis relative to base frame 28. Its Y coordinate position along the Y axis can be determined at any time simply from a direct readout of position indicator 60. The Y axis range of head 39 can be increased by sliding carriage base 46 relative to sub base 45 by a known increment referenced from index line 55. The known increment is added to or subtracted from the readout of readout device 60 to give the Y axis coordinate of head 39.

Figure 6:
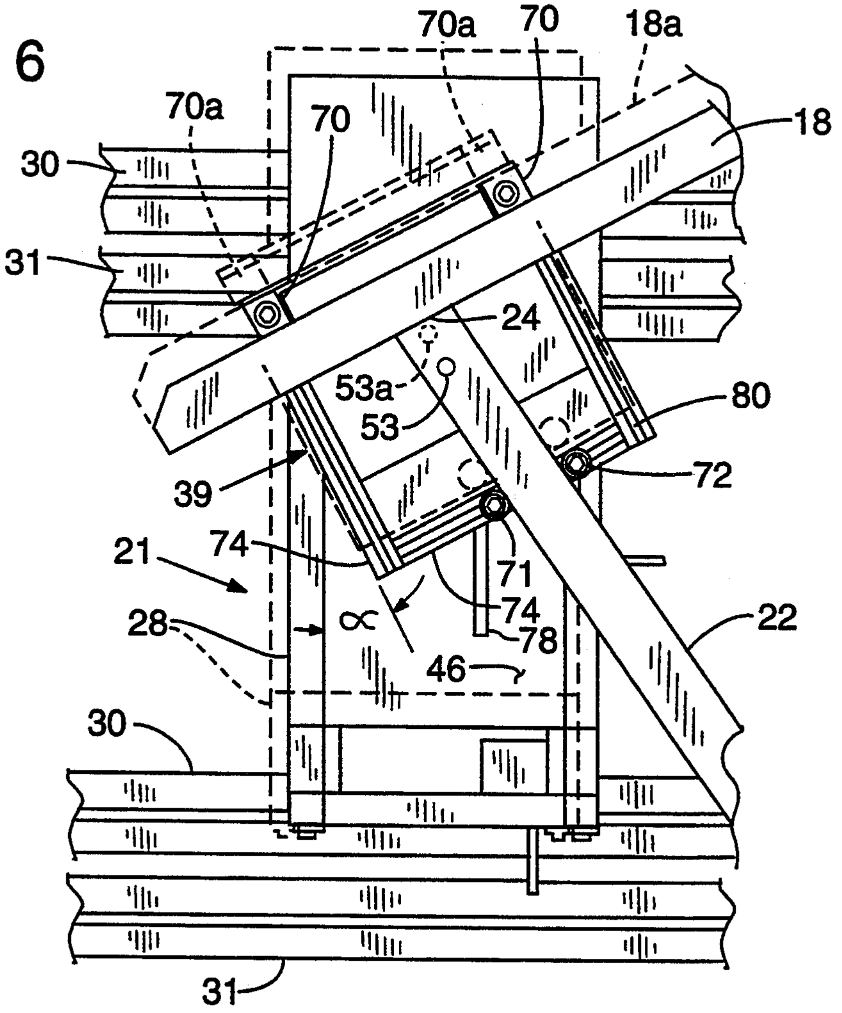
FIG. 6 is an enlarged top plan view of one of the pressing stands shown in FIG. 1.

Referring to FIG. 6, one of the pressing stands 21 of FIG. 1 is enlarged to illustrate the advantage of being able to pivot head 39 to an angular position relative to base frame 28 of the pressing stand. In FIG. 6 the pressing stand head 39 has been rotated through an angle $\alpha$ about its vertical reference axis 53 so that the abutment faces of abutment members 70 of the jig attached to head 39 are parallel to top chord 18 of the truss to be formed and fix the position of the top chord as previously noted. Roller type stops 71, 72, movable in a slot 80 of head cross frame member 74 abut truss web member 22 and are secured in position on member 74 to hold web member 22 in position while connector plates 27 (see FIG. 3) are pressed into the intersecting web and top chord members to join them together.

Abutments 70 and vertical reference axis 53 of head 39 in FIG. 6 are shown correctly positioned for holding a 2×4 inch top chord member in proper position for joinder to web member 22. However, if the top chord width dimension is 6 inches rather than 4 inches, the X and Y coordinates of reference axis 53 will change to change the positions of abutments 70 on head 39, as indicated by reference axis 53*a* and the dashed line position 70*a* of the abutment members in FIG. 6. Thus it will be appreciated that the width dimensions of the truss members will affect the X and Y coordinates of both the truss joints and the press stands.

USE AND OPERATION

Typically a detail sheet is given to the pressman specifying in detail the truss components. In the present invention the sheet would also give the desired position in terms of the X-Y coordinates of each pressing stand 20, 21 as well as the pivot angle $\alpha$ (FIG. 6) of those pressing stands that require their upper stand portions to be pivoted. The most common roof slope is four inches of rise for every twelve inches of run (4 and 12 roof slope). The pivot angle of the upper stand therefor would be infrequently changed, so no provision has been made in the preferred embodiment for a direct readout of the pivot angle, although one could be provided.

Since the design software specifies the lumber size, the X-Y coordinate of each pressing stand specified by the software can take into account different lumber sizes. With parallel sets of guide rails, mechanically each pressing stand can be accurately positioned through its rack-and-pinion drive 34, 35, 36 coupled to its position indicator 37 indicating the position of the stand along the X axis at all times. The upper stand, or head, 39 providing the work support portions 73 of the stand, through its similar rack-and-pinion drive 38, 42, 44, coupled to its digital position indicator 60, is accurately positioned at the desired Y axis coordinate.

In the initial setup of the system, the X-position or coordinate of each set of guide rails is located with respect to the common zero reference or origin. The Y-position or coordinate of each pressing stand on its set of guide rails is calibrated from the same common zero reference or origin, where the X and Y axes intersect. A range of Y coordinate values for each track is set, determined by the Y coordinate of a rail set and the range of movement of the head of a stand.

With each stand 20, 21 set up and calibrated to give a direct reading of its X and Y coordinates with reference to the origin or zero point of the coordinate system, each stand can be moved through its rack-and-pinion drive system to its designed X and Y coordinate position. In this regard, first each stand 20 or 21 is driven to its predetermined X coordinate and secured in that position. Then the head of the stand is driven along its guide rails parallel to the Y axis of the coordinate system until the head (or more accurately its vertical reference axis 53) is positioned at its predetermined Y coordinate and there secured in such position. When all stands and their heads have been positioned at their designated X and Y coordinates, the precut wooden truss members are positioned on the work support portions 73 of their respective stands and they are secured in position by suitable clamps, abutments or other fixtures well-known in the art and of conventional design. With the truss members thus accurately positioned on the stands, the truss connector plates 27 are placed in position at the joints or intersections between members and there pressed into the adjoining wooden members, typically by a conventional hydraulic pressing means, to form the completed truss.

Being able to quickly, easily and accurately position the pressing stands without the use of the truss components saves a substantial amount of time in truss production, thereby increasing the production from the pressing system.

ALTERNATIVE PRESS STAND DRIVE SYSTEM

Figure 7:
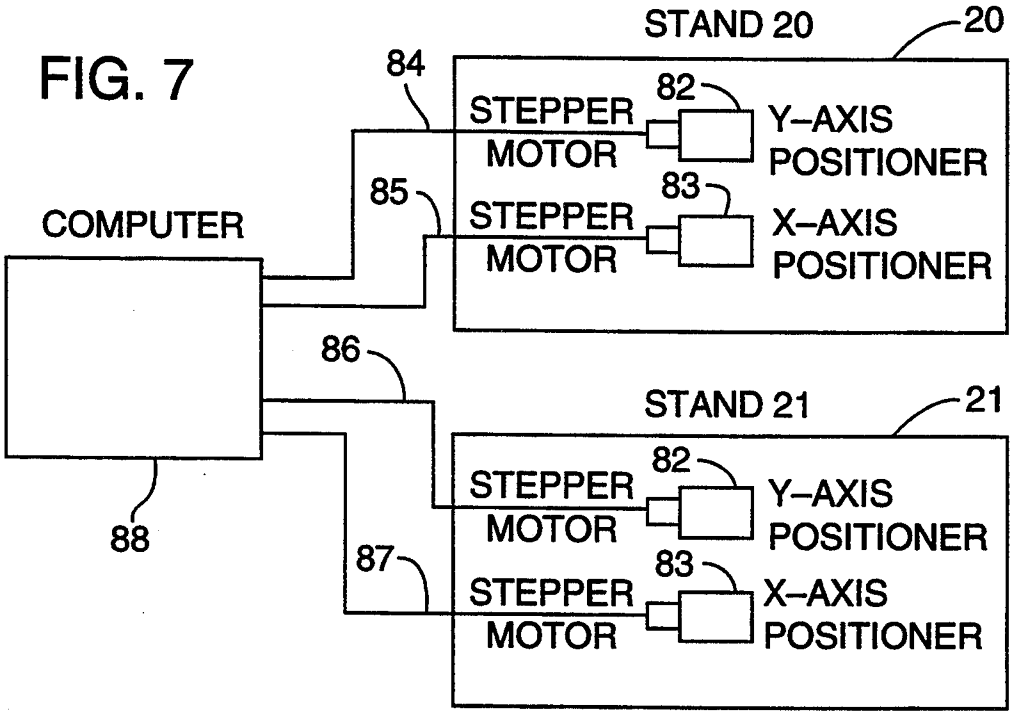
FIG. 7 is a schematic diagram of an optional computerized stepper motor drive system and positioning means of the invention.

Referring to FIG. 7, a computerized stepper motor drive system is disclosed for driving each pressing stand 20, 21 along the X axis of the coordinate system and also for driving the head portion 39 of each pressing stand 20, 21 along the Y axis of such system. Such a computerized system could replace the manual crank operated rack-and-pinion drive systems previously described with reference to FIGS. 2 and 3. Using such a system, all pressing stands and their heads can be positioned at their designated X and Y coordinates remotely.

In a similar manner, carriage base 46 of each stand can be positioned on sub base 45 on command from a computer control system by use of a stepper motor, or alternatively an air cylinder, solenoid or other positioner, to move the desired position line 56, 57, 58, to the index line 55 to position head 39 at the desired Y axis location.

Instead of the cranks 36, 38 to drive the pinions 35, 41, 42 to move each pressing stand to its designated X coordinate and its head to its designated Y coordinate, stepper motors or equivalent positioners are used for this task. Thus, in the illustrated embodiment of FIG. 7, each pressing stand 20 carries two stepper motors 82, 83, the motor 82 for driving the head 39 relative to the base frame of the stand along the Y axis and motor 83 for driving the stand itself along its associated track along the X axis. Similarly, each stand 21 includes two stepper motors 82, 83 for the same purpose. Each stepper motor is connected by a conductor cable 84, 85, 86, 87 to a computer 88. Computer 88 is programmed to drive the stepper motors of the various pressing stands and their heads on command. Each stepper motor 82, 83 in effect replaces a hand crank 36, 38 to provide the power for driving pinions 35 and 41, 42. Each pulse signal to a stepper motor 82, 83 causes such motor to drive its associated pinion through a predetermined angular distance and thus its mating rack and connected stand or head through a predetermined linear distance along the X or Y axis of the coordinate system. Thus, through appropriate commands and programming, the computer operator causes each of preselected stands 20, 21 to be positioned at predetermined X and Y coordinates of the coordinate system, ready to receive the precut wooden truss members for joinder. The conductor cables between computer 88 and the various stepper motors 82, 83 can be routed along the guide rails so as not to obstruct stand movement and to avoid cable damage. Although computer 88 is shown controlling the movement of only two pressing stands 20, 21, it is to be understood that the same computer would control positioning of all pressing stands 20, 21 in the system.

Such a computerized drive and positioning system minimizes the amount of labor required in setting up the jig system to receive the truss components. Considerable set up time can also be saved, as all activated pressing stands needed for a given truss setup can be positioned simultaneously. However, a computerized system as described would increase significantly the cost of the overall truss fabrication system and method described.

Having illustrated and described the invention with reference to specific currently preferred embodiments, it is to be understood that these embodiments are merely illustrative of the application of the principles of the invention- Numerous modifications may be made therein and other arrangements may be devised without departing from the spirit and scope of the invention as claimed.

We claim:

1. A method of fabricating a wooden truss from plural wood members joined together by connector plates pressed into the members at their joints while supported at their joints by multiple movable support members in support positions for positioning the connector plates and wood members to be joined, said method comprising:

designing a truss to be fabricated with reference to an X-Y coordinate system having an X axis intersecting a Y axis at a right angle at a zero reference point, and in designing the truss calculating and assigning to each movable support member its support position defined by an X coordinate and a Y coordinate of the coordinate system as measured from the zero reference point;

superimposing the X-Y coordinate system on a work surface over which the truss is to be fabricated;

mounting each of the multiple movable support members on the work surface having the X-Y coordinate system superimposed thereon for movement on the work surface;

moving each of the multiple movable support members on the work surface to its assigned support position by tracking the movement of the support member with reference to the zero reference point of the X-Y coordinate system and stopping such movement when the support member reaches the X and Y coordinates of its assigned support position;

while maintaining each support member in said assigned support position, positioning the wood members to be joined on the support members to intersect one another in their correct positions for being joined together; and pressing a pair of connector plates into the wood members while maintaining the support members in their assigned support positions, thereby fabricating the truss.

2. The method of claim 1 including moving a movable support member along one of the X and Y axes and moving a work support portion of the same member along the other of the X and Y axes to position the work support portion at the x and Y coordinates of the assigned support position of the support member.

3. The method of claim 1 including mounting the movable support members for movement on plural guideways on the work surface, the guideways extending parallel to one another and to one of the X and Y axes at predetermined coordinate positions with reference to the other of the X and Y axes such that the movable support members can be moved along their associated guideways to at least one of the X and y coordinates of their respective support positions.

4. The method of claim 3 including tracking the movement of each support member along its associated guideway with reference to its parallel axis of the X-Y coordinate system and stopping such movement when the member reaches the X or Y coordinate of its support position along said axis.

5. The method of claim 3 including mounting a work support portion of a movable support member for movement in a direction along the other of the X and Y axes of the X-Y coordinate system such that the work support portion can be moved to the support position of the support member.

6. The method of claim 5 including tracking the movement of a support member along its associated guideway with reference to its parallel X or Y axis and the zero reference point and stopping such movement when the support member reaches one of the assigned X or Y coordinates of its support position along such axis, and tracking the movement of the work support portion of the support member along its parallel X or Y coordinate axis with reference to the zero reference point and stopping such movement when such portion is at the other of the X and Y coordinates of the support position.

7. The method of claim 1 wherein each support member comprises a separate pressing stand, and mounting the multiple pressing stands for movement on multiple guideways parallel to one another and to one of the X and Y axes of the coordinate system, providing each pressing stand with an upper head portion movable in a direction parallel to the other of the X and Y axes of the X-Y coordinate system, and moving each pressing stand along its associated guideway and each head portion on its associated pressing stand such that each head portion is positioned at the X and Y coordinates of the assigned support position of the support member for positioning and supporting the multiple wood members to be joined at their intersections on said head portions.

8. The method of claim 7 including coupling each pressing stand and the head portion of each pressing stand to a position indicator such that the position of each pressing stand and the position of each head portion with reference to the zero reference point of the X-Y coordinate system can be determined at any given point in their movements along the X and Y axes of the coordinate system.

9. The method of claim 1 wherein the movement of each support member on the work surface is tracked by coupling each support member to a position indicator providing a real-time indication of the X and Y coordinates of the position of the support member on the work surface at any given time with reference to the zero reference point of the X-Y coordinate system.

* * * * *